(12) United States Patent
Weller (10) Patent No.: US 11,392,798 B2
(45) Date of Patent: Jul. 19, 2022

(54) AUTOMATION RATING FOR MACHINE LEARNING CLASSIFICATION

(71) Applicant: SAP SE, Walldorf (DE)

(72) Inventor: Tobias Weller, Buseck (DE)

(73) Assignee: SAP SE, Walldorf (DE)

( * ) Notice: Subject to any disclaimer, the term of this patent is extended or adjusted under 35 U.S.C. 154(b) by 856 days.

(21) Appl. No.: 16/192,679

(22) Filed: Nov. 15, 2018

(65) Prior Publication Data

US 2020/0160095 A1    May 21, 2020

(51) Int. Cl.
*G06K 9/62* (2022.01)
*G06N 20/00* (2019.01)

(52) U.S. Cl.
CPC .......... *G06K 9/626* (2013.01); *G06K 9/623* (2013.01); *G06K 9/6257* (2013.01); *G06K 9/6263* (2013.01); *G06N 20/00* (2019.01)

(58) Field of Classification Search
CPC ............... G06K 9/626; G06N 20/00

USPC .......................................... 706/12
See application file for complete search history.

(56) References Cited

U.S. PATENT DOCUMENTS 10,467,252 B1 * 11/2019 Barsony ............... G06F 16/35

* cited by examiner

*Primary Examiner* — Jeffery A Williams
(74) *Attorney, Agent, or Firm* — Fountainhead Law Group P.C.

(57) ABSTRACT

In some embodiments, a first output is received from a first prediction network at a second prediction network. The first prediction network generates the first output from a first input. Also, a second input is received at the second prediction network that describes the first input. The second prediction network analyzes the first output and the second input and generates a second output that classifies the first output in one of a set of classifications. The first output is output with the one of the set of classifications for the second output where the second output indicates whether the first output should be reviewed when the second output is classified in a first classification in the set of classifications or not reviewed when the second output is classified in a second classification in the set of classifications.

20 Claims, 5 Drawing Sheets

AUTOMATION RATING FOR MACHINE LEARNING CLASSIFICATION

BACKGROUND

A machine learning application may output a result and also a confidence score, which indicates the confidence that the machine learning application thinks the result is correct. However, the score often does not provide much value to a user. For example, the user may still not know what to do with the output after seeing the confidence score.

In one use case, a machine learning application may classify documents into two classes. The machine learning application may classify each document and provide a percentage score about the confidence of the classification, such as a document #1 is classified in a class #1 with an 80% confidence, and a document #2 is classified in a class #2 with a 55% confidence. A user can review the results and can ascertain that document #1 is being classified with a higher confidence than document #2. However, the user still has to individually decide what confidence is sufficient for not reviewing the output again. For example, in some cases, an 80% confidence can mean the result is correct; however, in other cases, the 80% confidence may mean the result is wrong. The only thing the user can ascertain is that document #1 was classified with a higher confidence than document #2, but the user cannot determine whether or not the user needs to review the output again. This results in an inefficient review process and lowers the value of using the machine learning application.

DETAILED DESCRIPTION

Described herein are techniques for an automation ratings system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

A system includes a machine learning application that can generate output from an input. For example, the machine learning application classifies an input into a number of classes (e.g., a class #1 and a class #2). Although this classification is described, it will be understood that the machine learning algorithm may output other types of information, such as the machine learning application may detect structured information from a document and output a confidence level for the detected information. Additionally, the system includes an automation classification model that may indicate whether or not the output needs review by manual verification. For example, one output of the automation classification model may be that no manual verification is needed and another output may be that manual verification is needed.

In some embodiments, the automation classification model may consider variables that can have an impact on the machine learning results. This may be more complicated than specifying that a confidence score of greater than X % means that no review is required while everything below this confidence score requires manual review. Using the X % type of threshold will not capture that a concept that the same confidence score for different documents may indicate different needs for manual verification, such as a first document from a sender B with an 80% confidence level may not need manual verification; however, a second document from a sender B with an 80% confidence level might need manual verification. For example, a text-based PDF format might be more likely to not need manual verification than a scanned PDF format. The automation classification model may be able to balance the factors related to the variables to determine the automation output.

In some embodiments, the automation classification model may receive the machine learning model output in addition to automation specific input, and may output an indication whether a review is needed or not needed. The automation input may include metadata about the input to the machine learning model in addition to some calculated values based on the machine learning output. The automation classification model then uses the inputs to determine whether a manual verification review is needed or not needed. The indication may be a binary decision, such as no review needed or review needed.

Figure 1:
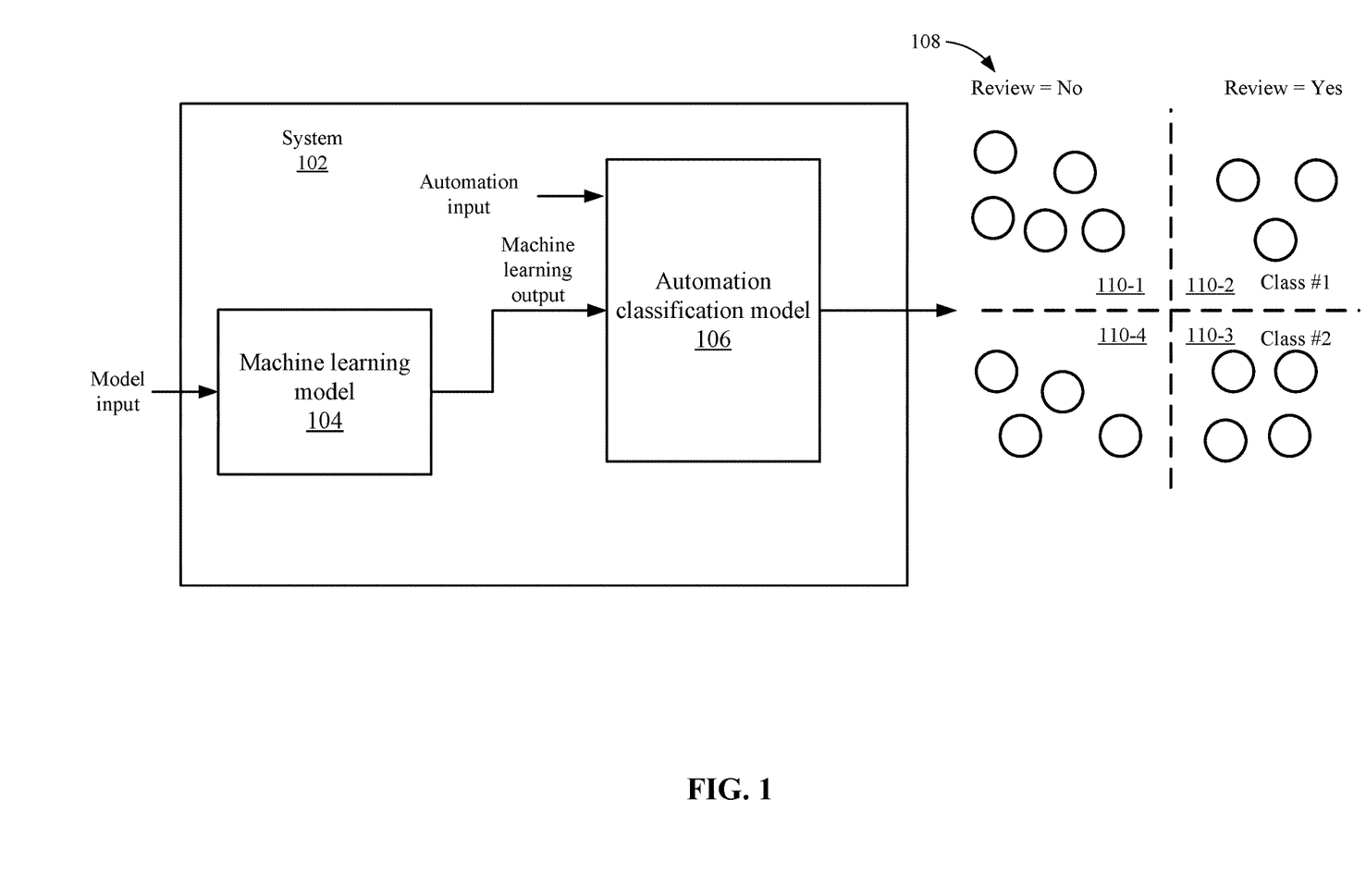
FIG. 1 depicts a system that is configured to output an indication whether or not an output needs to be reviewed according to some embodiments.

Adding the automation classification model to the machine learning output may greatly increase the effectiveness of the results generated by the machine learning model. For example, a user can automatically know whether or not review of the machine learning output is needed. The user does not have to guess whether a confidence score means the machine learning output should be reviewed or not. Further, the automation classification model may consider more fine-grained variables that may contribute to the review process compared to generating the confidence score. The automation classification model is trained to output a result that automates the review process of the machine learning output while the confidence score has no built in automation System Overview FIG. 1 depicts a system 102 that is configured to output an indication whether or not an output needs to be reviewed according to some embodiments. System 102 includes a machine learning model 104 and an automation classification model 106.

Machine learning model 104 may generate an output from a machine learning model input. In some examples, machine learning model 104 may classify machine learning model input into a number of classes, such as a class #1 and a class #2. In this case, the output of machine learning model 104 is class #1 and class #2. Machine learning model 104 may use different models to classify the model input. Also, although two classes are described, a different number of classes may also be appreciated. Additionally, machine learning model 104 may also output a confidence score associated with the output. Although machine learning model 104 may be described as performing a classification, machine learning model 104 may generate other output, such as recognizing text of a document and generating a confidence score for the recognized text. The classification for machine learning model 104 is described for discussion purposes only.

Instead of only using the machine learning output, some embodiments use automation classification model 106 to output an additional output referred to as an automation rating. In some embodiments, automation classification model 106 may be a binary classification model that may classify the input of automation classification model 106 into one of two results. For example, a result of "0" may mean a review is needed and a result of "1" may mean no review is needed (e.g., the process is automated and the machine learning output does not need review).

Automation classification model 106 may receive different input from machine learning model 104. For example, automation classification model 106 receives machine learning output from machine learning model 104 in addition to automation input. The machine learning output may be the initial classification in class #1 and class #2 in addition to the confidence score for the classification. The automation input may include metadata for the machine learning model input and/or calculated values that are calculated and not included in the machine learning model input. For example, the metadata may describe the machine learning model input, such as a customer, vendor, data type, country, industry, date, currency, etc. The calculated values may apply logic, such as business logic, to validate the machine learning output. For example, the business logic may compare different items in a document to determine if values are correct based on the business logic, such as a number of line items match a total that is the sum of the line items, line item dates are close together, etc.

Automation classification model 106 may output a value that indicates whether review is needed or not needed. If review is needed, then a user may manually review the output; and if no review is needed, then no manual review is needed and the output may be trusted without any other review.

A graph at 108 shows the output according to some embodiments. The results may be classified into four sections 110-1 to 110-4 in this example. For example, at 110-1, the machine learning model input has been classified into a machine learning output of a class #1 and the automation classification result indicated that no review is needed. Also, at 110-4, the machine learning model input has been classified into a machine learning output of a class #2 and the automation classification output indicates no review is needed again.

However, at 110-2, the machine learning model input has been classified into a machine learning output of class #1, but review is needed. Similarly, at 110-3, the machine learning model input has been classified into a machine learning output of class #2, but review is needed also. Accordingly, a user or process can automatically determine when review is needed or not needed.

Automation Classification

Figure 2:
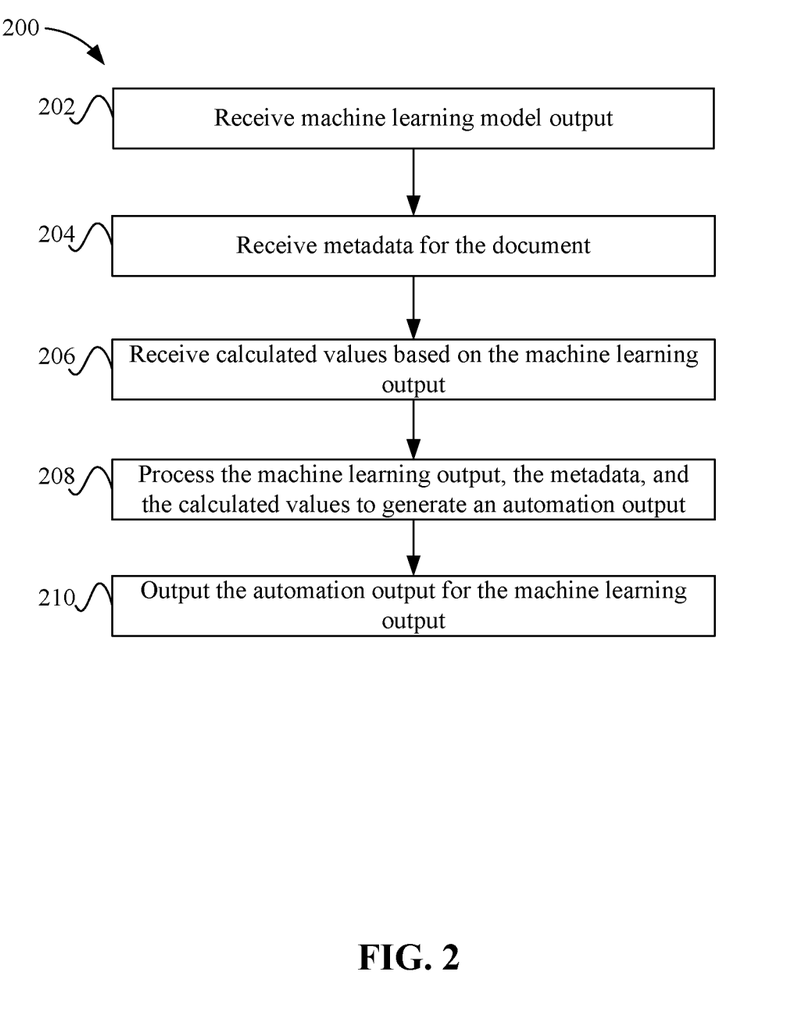
FIG. 2 depicts a simplified flowchart of a method for performing the automation classification according to some embodiments.

FIG. 2 depicts a simplified flowchart 200 of a method for performing the automation classification according to some embodiments. At 202, automation classification model 106 receives the machine learning model output. In one example, machine learning model 104 may receive payment advice documents and extract structured information from the documents. However, other inputs and outputs may be appreciated. A payment advice document is a letter sent by a customer to a supplier to inform the supplier that their invoices have been paid. The machine learning model may be a payment advice extraction machine learning service that extracts structured information out of the unstructured payment advice document. The payment advice documents may typically contain a header section with information like sender and receiver, currency, amount, date, reference number of the document, etc. Also, the payment advice document may include a table part that lists all the invoices that will be paid by the upcoming payment. Machine learning model 104 may extract these fields in a structured way from the payment advice document where each field includes a value and a confidence score. For example, machine learning model 104 may output a list of structured fields and confidence scores as follows:

REFERENCE_NO: (VALUE: "12345678", CONFIDENCE: 89.3)
DATE: (VALUE: "2018-11-05", CONFIDENCE: 83.2)
SENDER: (VALUE: "ABC CORP", CONFIDENCE: 75.6)
RECEIVER: (VALUE: "ZYX INC", CONFIDENCE: 25.2)
CURRENCY: (VALUE: "EUR", CONFIDENCE: 85.2)
AMOUNT: (VALUE: "12200.52", CONFIDENCE: 89.3)
LINE_ITEMS:
    LINE_ITEM:
        INVOICE_NO: (VALUE: "12345678", CONFIDENCE: 89.3)
        DATE: (VALUE: "2018-10-22", CONFIDENCE: 78.1)
        DISCOUNT: (VALUE: "10.99", CONFIDENCE: 15.8)
        AMOUNT: (VALUE: "1585.52", CONFIDENCE: 89.3)

Then, at 204, automation classification model 106 receives metadata for the document. Although metadata is described, other automation input that describes the documents that have been input into machine learning model 104 may also be received. For a payment advice document, the following metadata may be available:

FILE_TYPE: PDF
RECEIVED_BY: EMAIL
SENDER: TESTABC@RECEIVER.COM
DATE: 2018-10-12
PAGE_COUNT: 2
PDF_IS_SCANNED: FALSE

In the above metadata, the file type is the type of document, how the document was received indicates a communication method, the sender identifies the sender of the document, the date is the date the document was sent, the page count is the number of pages of the document, and if the PDF was scanned indicates whether the document was scanned or not. The metadata may be determined based on metadata the describes the payment advice document, and not information recognized from the document.

At 206, automation classification model 106 receives calculated values based on the machine learning output. Calculated values may also be created by machine learning model 104 in a separate step from the classification. For example, machine learning model 104 may apply business logic to information recognized from the document to determine the calculated values. The following may include calculated values:

LINE_ITEM_AMOUNT_MATCHES_TOTAL: TRUE
VARIANCE_LINE_ITEM_DATE: 5.2
INVOICE_NO_IN_MASTER_DATA: TRUE
SENDER_IN_MASTER_DATA: FALSE

The calculated values may have a huge impact on the validation of the model, but are not known to the model because the values are external information from the document and generated by business logic. For example, the line item amount should match the total amount of the payment advice. Further, typically, the line item dates (e.g., the dates of the invoices listed in the advice should not vary too much). If the invoice numbers in the document and the sender can be found in the company's master data, this is also an indicator that the output is correct. The above values may not be included in the information in the document; rather, another process calculates the values.

Figure 3:
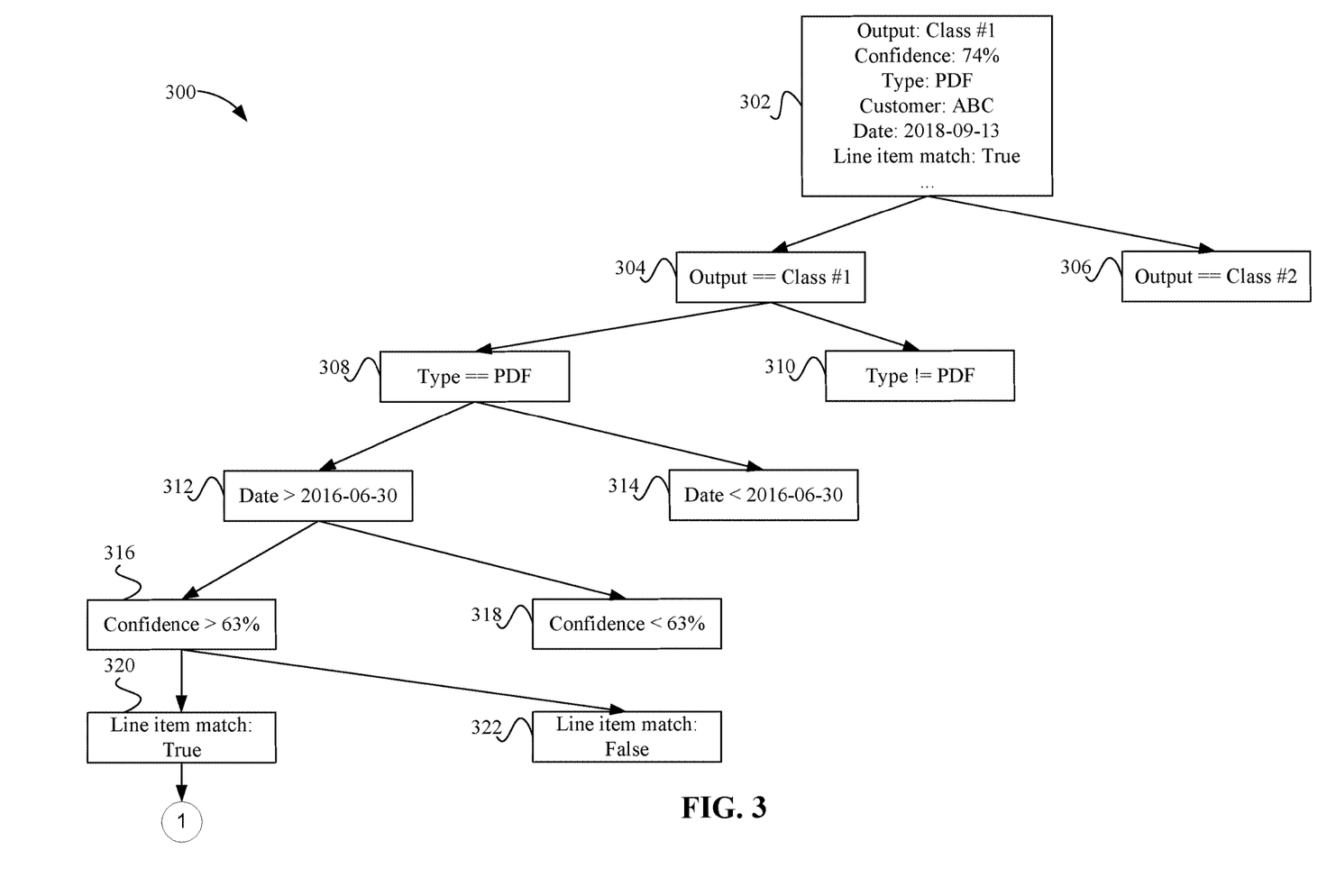
FIG. 3 shows an example of generating the automation output according to some embodiments.

At 208, automation classification model 106 then processes the machine learning output, the metadata, and the calculated values to generate an automation output. The automation output may indicate whether or not a review is needed. FIG. 3 shows an example of generating the automation output according to some embodiments. In some embodiments, automation classification model 106 may use a decision tree, but other models may be used. Also, only one path is shown for simplification purposes, but many more paths that consider all the input parameters to generate a final rating may be appreciated. At 302, the input includes the output of machine learning model 104 of "class #1" with a confidence score of 74%. The metadata includes a type of document of PDF, a customer of ABC, a date of 2018 Sep. 13, and a calculated value of a line item match is True. Automation classification model 106 then uses the input to traverse the tree to determine whether or not the automation output is a first value (e.g., no review needed) or a second value (e.g., review needed). For example, automation classification model 106 may determine if the output is equal to class #1 or class #2 at 304 or 306, respectively. Since the output is equal to class #1, then automation classification model 106 determines if the type is a PDF or not a PDF at 308 and 310, respectively. Since the type is PDF, automation classification model 106 moves to the next level to determine that the date is greater than 2016 Jun. 3 at 312. Then, at the next level, automation classification model 106 determines if the confidence level is greater than or less than 63% at 316 and 318, respectively. Finally, if the confidence level is greater than 63%, automation classification model 106 determines if the line item match is True or False at 320 and 322, respectively. If the line item match is True, then automation classification model 106 determines that the automation output is "1". Since automation classification model 106 outputs a binary number, the number "1" may indicate that review is not needed.

Referring back to FIG. 2, at 210, automation classification model 106 outputs the automation output for the machine learning output. As discussed above, the output may be a binary output indicating whether or not a review is needed.

Training

Figure 4:
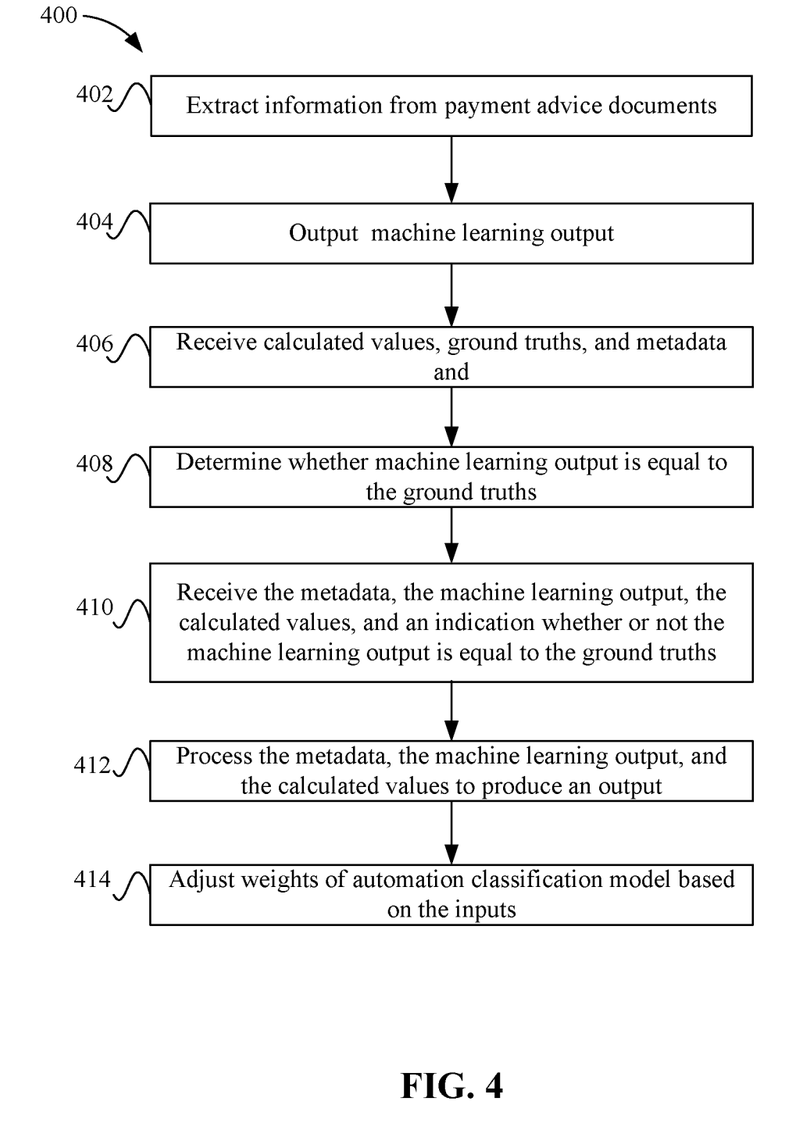
FIG. 4 depicts a simplified flowchart of a method for training the automation classification model according to some embodiments.

Automation classification model 106 needs to be trained to generate the automation output. FIG. 4 depicts a simplified flowchart 400 of a method for training automation classification model 106 according to some embodiments. In some examples, the training may use historical data, such as payment advice documents, with known ground truths. A ground truth is a known correct output. The payment advice documents may be processed by machine learning model 104 and then the output is compared to the ground truth to determine whether the model was correct or wrong and this information is used as training data to automation classification model 106. At 402, machine learning model 104 extracts information from the payment advice documents. At 404, machine learning model 104 outputs the machine learning output. At 406, automation classification model 106 receives calculated values, ground truths, and metadata. The calculated values may be generated based on the extracted information from the payment advice documents. Also, the ground truths indicate the real-world result that is expected for the machine learning output.

At 408, some embodiments determine whether or not the machine learning output is equal to the ground truths. For example, a process may compare the machine learning output to the ground truths to determine when they are equal. Then, at 410, automation classification model 106 receives the metadata, the machine learning output, the calculated values, and an indication whether or not the machine learning output is equal to the ground truths. At 412, automation classification model 106 may then process the metadata, the machine learning output, and the calculated values to produce an output.

At 414, the weights of automation classification model 106 are adjusted based on the inputs and the output of automation classification model 106. For example, automation classification model 106 may classify the machine learning output based on the metadata and the calculated values to determine whether or not review is needed. Then, automation classification model 106 may compare the automation output to the indication whether or not the machine learning output is equal to the ground truth. Automation classification model 106 then learns which factors indicate that the payment advice output is correct or in which cases it is unlikely to be correct using the indication that the machine learning output is equal to the ground truth or not equal to the ground truth. For example, when the machine learning output is equal to the ground truth, then the automation classification model 106 should output no review is needed, and when the machine learning output is not equal to the ground truth, then automation classification model 106 should output that review is needed. The weights of the model may be adjusted such that automation classification model 106 outputs a value of no review when the output is correct and review when the output is not correct.

Feedback

The process may not stop after the initial training. For example, automation classification model 106 may continue to learn based on use of the automation output. For example, a feedback loop may be used where regular feedback data based on whether or not a review is performed is sent back and used for re-training automation classification model 106. For example, when the output is sent for human verification, if a human changed something, then the automation rating was correct because it predicted that human review was needed. However, if nothing was changed during the review, the automation rating was incorrect because this document could have been processed automatically without review. This data may be sent back and used in another training step so that the automation classification model improves over time.

Conclusion

Accordingly, some embodiments add an automation classification step that improves the output of a machine learning model. Instead of providing a confidence score that may not be a reliable trigger for a user to review or not review an output, an automation classification model may analyze various factors to determine whether a review of an output is needed or not needed. This improves the classification of the input.

System

Figure 5:
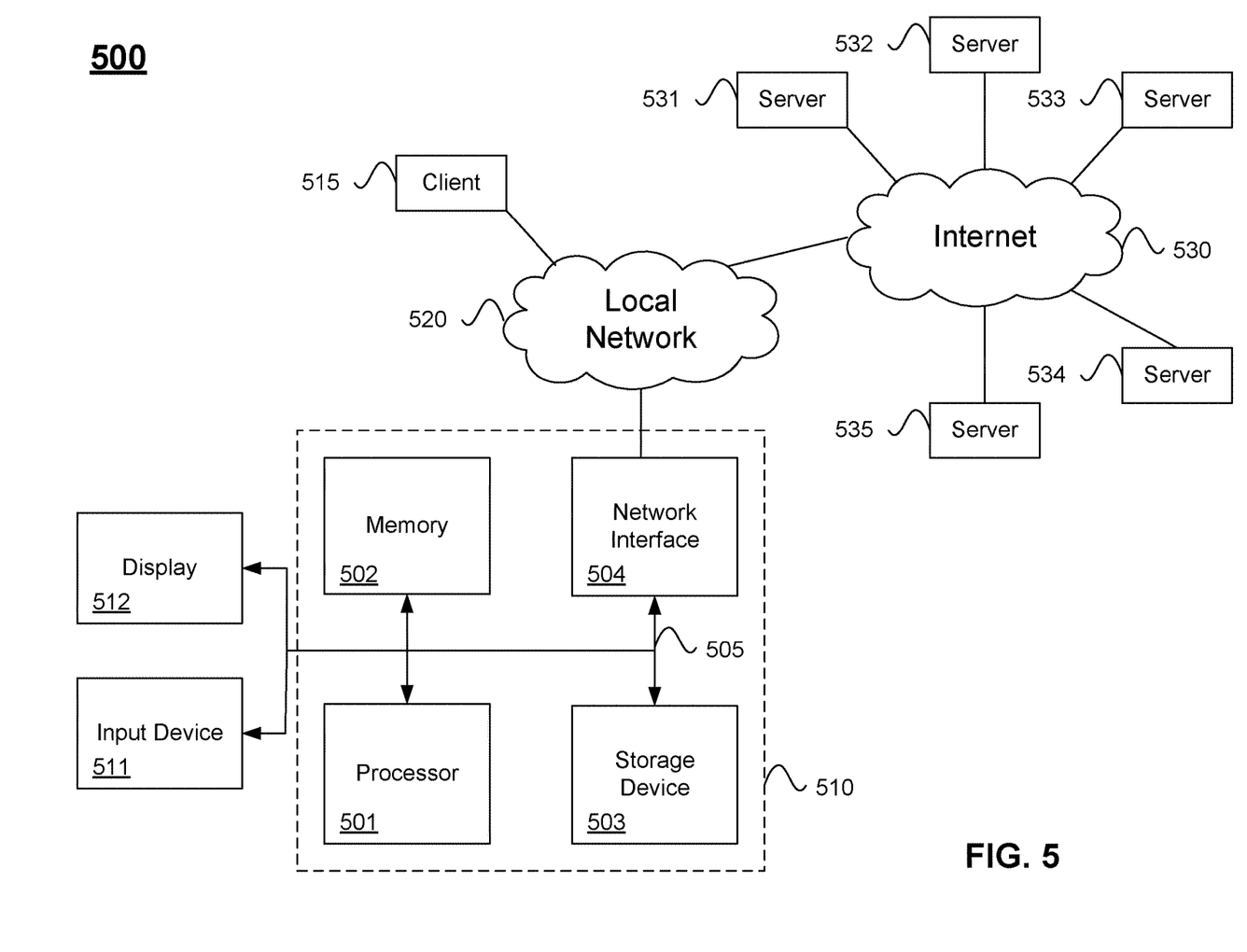
FIG. 5 illustrates hardware of a special purpose computing machine configured with the server according to one embodiment.

FIG. 5 illustrates hardware of a special purpose computing machine configured with server 102 according to one embodiment. An example computer system 510 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable storage mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information through the network interface 504 across a local network 520, an Intranet, or the Internet 530. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving, by a computing device, a first output from a first prediction network at a second prediction network, the first prediction network generating the first output from a first input;
   receiving, by the computing device, second input at the second prediction network that describes the first input;
   analyzing, by the computing device, the first output and the second input in the second prediction network to produce a second output, the second output classifying the first output in one of a set of classifications; and
   outputting, by the computing device, the first output with the one of the set of classifications for the second output, wherein the second output indicates whether the first output should be reviewed when the second output is classified in a first classification in the set of classifications or not reviewed when the second output is classified in a second classification in the set of classifications.

2. The method of claim 1, wherein the second input comprises: metadata describing information in the first input.

3. The method of claim 1, wherein the second input comprises: calculated values that are calculated based on information from the first input.

4. The method of claim 3, wherein the calculated values are calculated based on business logic that is applied to the information from the first input.

5. The method of claim 1, wherein analyzing the first output and the second input in the second prediction network comprises:
   traversing a hierarchical structure based on the first output and the second input describing the first input to select one of the set of classifications.

6. The method of claim 5, wherein analyzing the first output and the second input in the second prediction network comprises:
   traversing the hierarchical structure based on calculated values that are calculated based on information from the first input.

7. The method of claim 1, wherein the second prediction network comprises a model that classifies the first output and the second input into one of two classifications.

8. The method of claim 1, wherein:
   the set of classifications includes a first classification indicating the first output should be reviewed and a second classification indicating the first output should not be reviewed.

9. The method of claim 1, wherein the first output from the first prediction network classifies the first input into one of two classifications.

10. The method of claim 1, wherein the first prediction network comprises a machine learning model that is configured to analyze the first input and generate the first output.

11. The method of claim 1, further comprising:
training the second prediction network using a training set of first inputs, a training set of first outputs generated from the first prediction network, a training set of second inputs that describes the training set of first inputs, and a set of ground truths for the training set of first inputs.

12. The method of claim 11, wherein training the second prediction network comprises:
generating a training set of second outputs;
evaluating the training set of second outputs according to whether the training set of first inputs equals the set of ground truths; and
adjusting parameters of the second prediction network based on the evaluating.

13. The method of claim 11, wherein training the second prediction network comprises:
generating a training set of calculated values that are calculated from the training set of first outputs; and
using the training set of calculated values in training the second prediction network.

14. The method of claim 1, further comprising:
receiving feedback from a review of the first output when the first output is classified in the first classification in the first set of classifications; and
training the second prediction network based on the feedback.

15. The method of claim 13, wherein:
when the first output was changed during the review, the second output is deemed correct in the training of the second prediction network, and
when the first output is not changed during the review, the second output is deemed not correct in the training of the second prediction network.

16. A non-transitory computer-readable storage medium containing instructions, that when executed, control a computer system to be configured for:
receiving a first output from a first prediction network at a second prediction network, the first prediction network generating the first output from a first input;
receiving second input at the second prediction network that describes the first input;
analyzing the first output and the second input in the second prediction network to produce a second output, the second output classifying the first output in one of a set of classifications; and;
outputting the first output with the one of the set of classifications for the second output, wherein the second output indicates whether the first output should be reviewed when the second output is classified in a first classification in the set of classifications or not reviewed when the second output is classified in a second classification in the set of classifications.

17. The non-transitory computer-readable storage medium of claim 16, wherein the second input comprises:
metadata describing information in the first input.

18. The non-transitory computer-readable storage medium of claim 16, wherein the second input comprises:
calculated values that are calculated based on information from the first input.

19. The non-transitory computer-readable storage medium of claim 16, further configured for:
training the second prediction network using a training set of first inputs, a training set of first outputs generated from the first prediction network, a training set of second inputs that describes the training set of first inputs, and a set of ground truths for the training set of first inputs.

20. An apparatus comprising:
one or more computer processors; and
a non-transitory computer-readable storage medium comprising instructions, that when executed, control the one or more computer processors to be configured for:
receiving a first output from a first prediction network at a second prediction network, the first prediction network generating the first output from a first input;
receiving second input at the second prediction network that describes the first input;
analyzing the first output and the second input in the second prediction network to produce a second output, the second output classifying the first output in one of a set of classifications; and;
outputting the first output with the one of the set of classifications for the second output, wherein the second output indicates whether the first output should be reviewed when the second output is classified in a first classification in the set of classifications or not reviewed when the second output is classified in a second classification in the set of classifications render the second map extent of the map to include the geometries defined by the spatial data represented by the geo-enriched data in the set of geo-enriched data that is within the second map extent.

* * * * *